United States Patent [19]

Johansson et al.

[11] Patent Number: 5,528,640
[45] Date of Patent: Jun. 18, 1996

[54] LOW PRESSURE DOUBLE OFFSET PLATE CATCHER FOR A NUCLEAR REACTOR

[75] Inventors: Eric B. Johansson, Wrightsville Beach; Jaime A. Zuloaga, Jr., Wilmington, both of N.C.; David W. Danielson, Aptos, Calif.

[73] Assignee: General Electric Company, Schenectady, N.Y.

[21] Appl. No.: 335,959

[22] Filed: Nov. 7, 1994

[51] Int. Cl.⁶ .................................................. G21C 19/42
[52] U.S. Cl. ........................... 376/313; 376/310; 376/352; 376/365
[58] Field of Search .................................. 376/313, 310, 376/352, 365; 976/DIG. 264

[56] References Cited

U.S. PATENT DOCUMENTS

| | | | |
|---|---|---|---|
| 1,240,081 | 9/1917 | Moss. | |
| 1,504,233 | 8/1924 | Graham. | |
| 1,992,472 | 2/1935 | Craig | 210/165 |
| 3,414,474 | 12/1968 | Swanson | 176/68 |
| 3,528,885 | 9/1970 | Kumpf | 176/78 |
| 3,725,199 | 4/1973 | Notari et al. | 176/61 |
| 3,801,453 | 4/1974 | Jones | 136/78 |
| 3,840,051 | 10/1974 | Akashi et al. | 138/37 |
| 3,878,870 | 4/1975 | Atherton et al. | 138/16 R |
| 3,879,259 | 4/1975 | Persson et al. | 176/36 R |
| 3,945,883 | 3/1976 | Hind et al. | 176/40 |
| 3,971,698 | 7/1976 | Wolff et al. | 176/78 |
| 4,032,398 | 6/1977 | Cross et al. | 176/43 |
| 4,036,690 | 7/1977 | Betts et al. | 176/78 |
| 4,053,358 | 10/1977 | Pennell | 176/50 |
| 4,053,359 | 10/1977 | Pennell et al. | 176/40 |
| 4,076,586 | 2/1978 | Bideau et al. | 176/78 |
| 4,096,032 | 6/1978 | Mayers et al. | 176/38 |
| 4,116,764 | 9/1978 | Jones | 176/38 |
| 4,198,272 | 4/1980 | Salmon | 176/40 |
| 4,280,906 | 7/1981 | Liljegren | 210/282 |
| 4,412,969 | 11/1983 | Tilbrook et al. | 376/280 |
| 4,420,457 | 12/1983 | Le Pargneux | 376/446 |

(List continued on next page.)

FOREIGN PATENT DOCUMENTS

| | | |
|---|---|---|
| 90104066 | 12/1990 | China. |
| 0196611 | 3/1986 | European Pat. Off.. |
| 0289829 | 4/1988 | European Pat. Off.. |
| 0311037 | 12/1989 | European Pat. Off.. |
| 0455011A1 | 4/1991 | European Pat. Off.. |
| 0432739A1 | 12/1991 | European Pat. Off.. |
| 0435744A1 | 12/1991 | European Pat. Off.. |
| 0432738A1 | 12/1991 | European Pat. Off.. |
| 0466553A1 | 7/1992 | European Pat. Off.. |
| 4006264A1 | 2/1991 | Germany. |
| 54-19080 | 2/1979 | Japan. |
| 54-141989 | 5/1979 | Japan. |
| 54-102493 | 8/1979 | Japan. |
| 57-102215 | 6/1982 | Japan. |
| 60-162985 | 8/1985 | Japan. |
| 62-96891 | 8/1987 | Japan. |
| 63-157093 | 6/1988 | Japan. |
| 63-61183 | 8/1988 | Japan. |
| 64-39593 | 2/1989 | Japan. |
| 64-83189 | 3/1989 | Japan. |
| 3-111795 | 8/1991 | Japan. |
| 3-274491 | 12/1991 | Japan. |
| 1214998 | 12/1970 | United Kingdom. |

*Primary Examiner*—Donald P. Walsh
*Assistant Examiner*—Meena Chelliah
*Attorney, Agent, or Firm*—Nixon & Vanderhye

[57] ABSTRACT

A fuel bundle and lower tie plate assembly for a nuclear reactor includes a plurality of fuel rods supported between an upper tie plate and a lower tie plate assembly. The lower tie plate assembly includes an upper grid portion and a lower body portion, the upper grid portion having a plurality of fuel rod supporting bosses interconnected by a plurality of webs thus forming flow openings between the bosses. The body portion includes an inlet nozzle and a peripheral wall extending between the bottom nozzle and the upper grid portion to define a flow volume therein. A debris catcher is located within the flow volume and includes a pair of superposed plates, the plates each having a plurality of holes of substantially the same size, shape and pitch, but wherein the holes of one of the pair of plates are offset from the holes of the other of the pair of plates by one half the hole pitch.

13 Claims, 10 Drawing Sheets

U.S. PATENT DOCUMENTS

| | | | |
|---|---|---|---|
| 4,427,624 | 1/1984 | Marlatt et al. | 376/352 |
| 4,446,099 | 5/1984 | Schwind et al. | 376/277 |
| 4,505,877 | 3/1985 | Rion | 376/352 |
| 4,610,838 | 9/1986 | Gasparro et al. | 376/248 |
| 4,614,636 | 9/1986 | Walters | 376/451 |
| 4,615,862 | 10/1986 | Huckstein | 376/362 |
| 4,634,525 | 1/1987 | Yant | 210/171 |
| 4,652,425 | 3/1987 | Ferrari et al. | 376/352 |
| 4,655,995 | 4/1987 | Freeman et al. | 376/267 |
| 4,664,880 | 5/1987 | Bryan | 376/352 |
| 4,678,627 | 7/1987 | Rylatt | 376/313 |
| 4,684,495 | 8/1987 | Wilson et al. | 376/352 |
| 4,684,496 | 8/1987 | Wilson et al. | 376/352 |
| 4,716,012 | 12/1987 | Gasparro et al. | 376/352 |
| 4,772,447 | 9/1988 | Manson et al. | 376/441 |
| 4,781,884 | 11/1988 | Anthony | 376/439 |
| 4,826,653 | 5/1989 | Nylund et al. | 376/444 |
| 4,828,791 | 5/1989 | DeMario | 376/352 |
| 4,832,905 | 5/1989 | Bryan et al. | 376/352 |
| 4,849,161 | 7/1989 | Brown et al. | 376/439 |
| 4,900,507 | 2/1990 | Shallenberger et al. | 376/352 |
| 4,919,883 | 4/1990 | Bryan et al. | 376/352 |
| 4,933,138 | 6/1990 | Movesca et al. | 376/442 |
| 4,980,121 | 12/1990 | Roberts et al. | 376/439 |
| 5,009,839 | 4/1991 | King | 376/352 |
| 5,024,806 | 6/1991 | Cioffi et al. | 376/352 |
| 5,024,807 | 6/1991 | Hatfield et al. | 376/352 |
| 5,030,412 | 7/1991 | Yates et al. | 376/352 |
| 5,037,605 | 8/1991 | Riordan, III | 376/352 |
| 5,066,453 | 11/1991 | Heppenstall et al. | 376/352 |
| 5,071,617 | 12/1991 | Bryan et al. | 376/352 |
| 5,094,802 | 3/1992 | Riordan, III | 376/352 |
| 5,100,611 | 3/1992 | Nylund | 376/352 |
| 5,106,575 | 4/1992 | Nakamura et al. | 376/439 |
| 5,128,096 | 7/1992 | Grattier | 376/313 |
| 5,135,710 | 8/1992 | Grattier et al. | 376/313 |
| 5,160,697 | 11/1992 | Verdier et al. | 376/352 |
| 5,161,909 | 12/1992 | Leroux | 376/352 |
| 5,180,545 | 1/1993 | Grattier | 376/352 |
| 5,219,517 | 6/1993 | Nylund | 376/352 |
| 5,225,152 | 7/1993 | Verdier | 376/352 |
| 5,230,861 | 7/1993 | Nylund | 376/439 |
| 5,282,231 | 1/1994 | Adams et al. | 376/352 |
| 5,283,812 | 2/1994 | Verdier | 376/352 |
| 5,345,483 | 9/1994 | Johansson | 376/313 |
| 5,365,558 | 11/1994 | Lippert et al. | |
| 5,390,221 | 2/1995 | Dix et al. | 376/352 |

5,528,640

LOW PRESSURE DOUBLE OFFSET PLATE CATCHER FOR A NUCLEAR REACTOR

TECHNICAL FIELD

The present invention relates to nuclear reactors in general and to boiling water lower tie plate assemblies for a nuclear reactor fuel bundle in particular. Even more specifically, the invention relates to a debris catcher incorporated within the fuel bundle lower tie plate assembly, the debris catcher formed by a pair of vertically spaced, relatively thick plates, each formed with relatively large holes of similar size and pitch, but with the hole pattern in the upper plate offset from the hole pattern in the lower plate. The debris catcher is constructed to afford minimum pressure loss for coolant flow through the lower tie plate assembly and into the fuel bundle region downstream of the lower tie plate assembly.

BACKGROUND

Boiling water nuclear reactors (BWR's) have been in operation for many years. Commencing with their initial construction and throughout their service lives, these reactors have been known to accumulate debris in their closed circulation moderator (coolant) systems. This debris can become an operating hazard if allowed to enter into the fuel bundle core region containing the heat generating fuel rods. In fact, debris is a leading cause of fuel rod failure BWR's. In order to understand this problem, a summary of reactor construction as it relates to the accumulation of debris in the core needs will be helpful. Thereafter, the fuel bundle construction will be described with emphasis on the need to preserve substantially unchanged the regions of pressure drop within the fuel bundles. The effects caused by debris entering into the fuel rod region of the fuel bundles will then be summarized.

In BWR construction, the reactor is provided with a large, central core. Liquid water coolant/moderator flow enters the core from the bottom and exits the core as a water steam mixture from the top. The core includes many side-by-side fuel bundles, each containing a plurality of fuel rods. Water is introduced into each fuel bundle through a fuel bundle support casting from a high pressure plenum situated below the core. Water passes in a distributed flow through the individual fuel bundles and about the fuel rods where it is heated to generate steam, and then exits the upper portion of the core as a two-phase water steam mixture from which the steam is extracted for the generation of energy.

The core support castings and fuel bundles are a source of pressure loss in the circulation of water through the core. By properly controlling such pressure losses, substantially even distribution of flow across the individual fuel bundles of the reactor core is achieved. When it is remembered that there are as many as 750 individual fuel bundles in a reactor core, it can be appreciated that assurance of the uniformity of flow distribution is important. To interfere with the existing pressure drop within the fuel bundles could negatively affect the overall distribution of coolant/moderator within the fuel bundles of the reactor core.

The fuel bundles for a BWR are typically supported between lower and upper tie plate assemblies. The lower tie plate assembly is a one-or two-piece structure including 1) an upper grid and 2) a lower inlet nozzle and associated structure providing a transition region from the inlet nozzle to the grid. The inlet nozzle provides for coolant entry to an enlarged flow volume within the flow transition region of the lower tie plate assembly. At the upper end of the flow volume, there is located a tie plate grid. The tie plate grid has two purposes. First, it provides a mechanical support connection for the weight of the individual fuel rods to be transmitted through the lower tie plate assembly to the fuel support casting. Secondly, the tie plate grid provides a path for liquid water moderator to flow into the fuel bundle region for passage between the side-by-side supported fuel rods.

Above the lower tie plate grid, each fuel bundle includes a matrix of upstanding fuel rods, each containing fissionable material which, when undergoing nuclear reaction, transfers energy to the flowing water to produce the power generating steam. The matrix of upstanding fuel rods is engaged at its upper end by the upper tie plate assembly. Usually, water rods also extend (within the fuel rod matrix) between the upper and lower tie plate assemblies for improvement of the water moderator to fuel ratio, particularly in the upper region of the fuel bundle.

Fuel bundles also include a number of fuel rod spacers at varying elevations along the length of each bundle. These spacers are required because the fuel rods are long (about 160 inches) and slender (about 0.4 to 0.5 inches in diameter), and would come into abrading contact under the dynamics of fluid flow and nuclear power generation. The spacers provide appropriate lateral restraints for each fuel rod at their respective elevations, and thus prevent abrading contact between the fuel rods and maintain the fuel rods at uniform spacing relative to one another along the length of the fuel bundle for optimum performance. It will be appreciated that these spacers are sites where debris can be trapped and damage the fuel rods.

Each fuel bundle is surrounded by an elongated channel. This channel confines water flowing between the upper and lower tie plate assemblies to a single bundle in an isolated flow path. The channel also serves to separate the steam generating flow path through the fuel bundles from the surrounding core bypass region used for the penetration of the control rods. The water in the bypass region also provides neutron moderation.

In the operation of a BWR, maintenance of the originally designed flow distribution is very important. Specifically, from the core inlet to the core outlet, about 20 pounds per square inch (psi) of the pressure drop is encountered at typical flow operating conditions. About 7 to 8 psi of this pressure drop occurs through the inlet orifice and fuel support casting. This pressure drop is mainly to assure the uniform distribution of coolant/moderator flow through the many fuel bundles making up the core of the reactor, and is related to the prevention of operating instabilities within the reactor at certain power rates. At the lower tie plate assembly of each fuel bundle, from the inlet nozzle into the flow volume and through the tie plate grid, about 1 to 1-½ psi pressure drop occurs which contributes to uniform flow distribution between the individual fuel rods of each fuel bundle. Finally, through the fuel bundle itself—from the exit of the lower tie plate assembly to the exit at the upper tie plate assembly—about 11 psi of pressure drop usually occurs. When new fuel bundles are introduced into a reactor core, these flow resistances must be preserved. Otherwise, the coolant/moderator flow distribution could be compromised among the various types of fuel in the reactor core.

With respect to the tie plate grid of the lower tie plate assembly, a matrix of cylindrical bosses and webs generally form the grid. The bosses are sized to receive the fuel rod end plugs. The flow area between the bosses and webs is the primary factor in controlling pressure drop resulting from water flow through the grid.

In early grid constructions, the fuel rods had greater cross-sectional diameters and the bosses were large. In more recent grid constructions, however, the fuel rods have smaller cross-sectional diameters and the bosses are smaller as well. Also, in early constructions, fewer fuel rods formed a fuel bundle than in recent constructions.

Even with all of these changes in grid and bundle construction, however, it is necessary to avoid significant changes in pressure drop. For example, a core may be composed of older (8×8) bundles and is newer (10×10) bundles, and the flow through each bundle preferably is uniform. One challenge with new fuel bundle constructions, and particularly lower tie plate grid constructions, is to accommodate more fuel rods and to perform a debris catching function, yet maintain a flow rate substantially equivalent to the flow experienced in older bundle constructions.

Typically, debris within BWR's can include extraneous materials left over from reactor construction as well as outage maintenance and repair activities. During the numerous outages and repairs, even further debris accumulates. Because nuclear reactors constitute closed circulation systems, it will be appreciated that debris will essentially accumulate with increasing age and use of the reactor. A particularly vexing but usual place for the accumulation of debris is in the fuel bundles between the fuel rods, and particularly in the vicinity of the fuel rod spacers. Debris particles tend to lodge between the spacer structure and the fuel rods and often dynamically vibrate with the coolant/moderator flow in abrading contact to the sealed cladding of the fuel rods.

Debris can be in a variety of shapes and sizes, such as rods of diameter as small as 0.025", small bolts, helical turnings from machining operations, and metal slabs. The primary objective of the debris catcher in accordance with this invention is to prevent entry of as much of this debris as possible into the fuel bundle. This objective would seemingly indicate use of a fine mesh wire screen. However, the debris catcher must be rugged so that there is no danger of the debris catcher being damaged, and thereby creating additional debris.

Another constraint on the debris catcher design is that a layer of deposits from the coolant should not build up and eventually close up the flow area. This constraint sets a lower limit to the hole size in a perforated plate. An additional constraint is that the pressure drop across the debris catcher should be limited, so that when new bundles with debris catchers are inserted in a core which also contains bundles without debris catchers, the pressure drop characteristics will be similar.

SUMMARY OF THE INVENTION

The present invention relates to a lower tie plate assembly incorporating a unique debris catcher which stops debris down to very small sizes, and minimizes the effect of build up of deposits from the coolant, but which also minimizes pressure loss. The lower tie plate assembly includes the usual upper part which forms the lower tie plate fuel rod supporting grid and a lower part which forms the lower tie plate flow volume and lower inlet orifice or nozzle. The debris catcher in accordance with the invention is in the form of a cartridge which is inserted into the lower tie plate lower part and welded in place. Before describing the debris catcher in any detail, however, a further brief discussion of the fuel rod supporting grid construction will be helpful.

As mentioned above, the lower tie plate grid supports the fuel rods in a manner enabling a smooth, substantially uniform expansion of coolant flow into the channeled fuel bundle. To accomplish the latter, a plurality of laterally spaced, generally cylindrical bosses defining through openings, extend between upper and lower surfaces of the lower tie plate grid and receive lower ends of the fuel rods. Webs also extend between those surfaces and interconnect the bosses. The bosses are arranged on vertical centerlines arranged at the corners of square matrices, with the webs extending linearly between the bosses along the sides of the square matrices. Convex portions of the cylindrical bosses extend between the right angularly related webs of each matrix. Thus, the webs and the convex portions of the bosses of the upper portion of the lower tie plate grid define coolant flow openings or flow areas between the bosses.

In accordance with this invention, a debris catcher is provided upstream of the lower tie plate grid, within the flow volume of the lower tie plate assembly. The debris catcher in the preferred arrangement is formed by a pair of relatively thick plates, each formed with relatively large holes. The hole dimensions and pitch are the same in the two plates, but the hole pattern in the upper plate is displaced by a distance equal to one half the hole spacing in each of two perpendicular directions.

In a first exemplary embodiment, the upper plate contains an array of square holes with rounded corners. The holes are surrounded by a series of substantially vertical ligaments or webs, the upper and lower edges of which are rounded to minimize flow resistance. The upper plate is also formed with a pair of elongated rails extending along two opposite side edges and projecting downwardly from the lower surface. The lower plate is also formed with an array of square holes with rounded corners similar to those of the upper plate. While the hole size and pitch of the lower plate is the same as in the upper plate, the array of holes is offset by a distance equal to one half the spacing between the holes in each of two mutually perpendicular directions. As a result, each hole of the upper plate is centered over the junction of four ligaments or webs in the lower plate.

The lower plate is formed with integral side plates on two opposite sides of the plate, extending upwardly and which are adapted to fit snugly in windows provided in opposite sides of the lower tie plate assembly. The upper plate fits within these side plates and rests on the lower plate. The lower plate also has elongated rails along two opposite side edges which mate with the rails on the upper plate. The two plates are welded together along the junction of these rails to form an integral unit. The unit may then be inserted through one of the windows in the lower tie plate and the side plates are then welded within the opposed windows of the lower tie plate assembly.

It should be pointed out that when the two debris catcher plates are joined together as described above, there is a vertical gap between the plates. The magnitude of this gap is a compromise between achieving low pressure drop, and limiting the size of debris which will be stopped. If the gap were zero, the pressure drop would be very large; as the gap increases, however, the rod diameter which can pass through at an angle to the vertical also increases. For a very large gap, greater than the rod length, the two plates for all intents and purposes would be independent of each other, and a rod would be able to pass through each plate as though the other plate were not present.

In a modified debris catcher design in accordance with this invention, the ligaments or webs which interconnect the holes in both the upper and lower plates are tapered from top to bottom to provide a diffuser for the flow through the holes. This arrangement reduces the exit pressure loss from the upper plate and provides a smoother flow transition from the lower plate to the upper plate.

In another modification of the debris catcher in accordance with the invention, tapered circular holes are utilized in each of the upper and lower plates. The taper angle is selected to provide a minimal pressure drop as the flow expands from the minimum diameter.

In each of the disclosed embodiments, the upper and lower plates are configured and arranged to avoid small flow passages so that any deposits building up on the filter surfaces will have a very small effect on reducing flow. The filtering action itself is obtained by flow paths which strain debris while adding very little pressure drop.

In accordance with a broad aspect of the invention, therefore, there is provided a lower tie plate assembly for a nuclear reactor comprising a an upper grid portion and a lower body portion the upper grid portion having a plurality of fuel rod supporting bosses interconnected by a plurality of webs thus forming flow openings between the bosses; the body portion including an inlet nozzle and a peripheral wall extending between the bottom nozzle and the upper grid portion to define a flow volume therein; and a debris catcher located within the flow volume and comprising a pair of superposed plates, the plates each having a plurality of holes of substantially identical size, shape and pitch, and wherein the holes of one of the pair of plates are offset from the holes of the other of the pair of plates.

Additional objects and advantages of the invention will become apparent from the detailed description which follows.

BRIEF DESCRIPTION OF THE DRAWINGS

FIG. 11 is a perspective of the upper and lower plates as shown in FIG. 10, but in an assembled state;

BEST MODE FOR CARRYING OUT THE INVENTION

Figure 1:
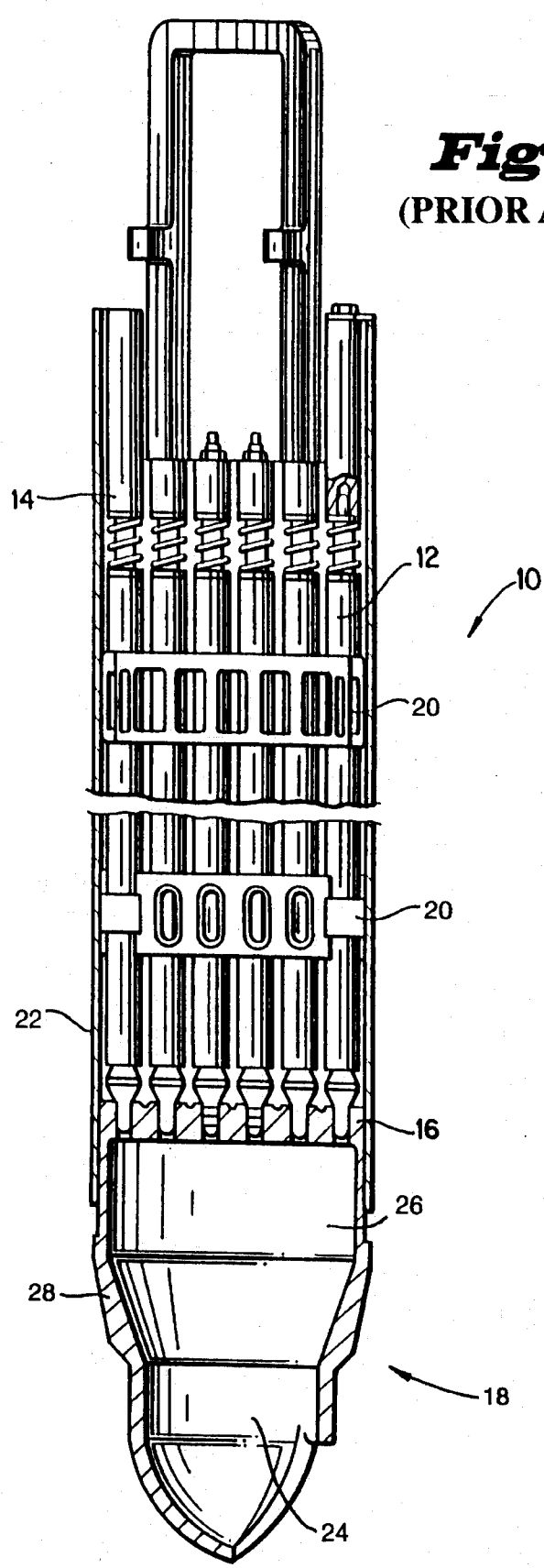
FIG. 1 is a partial side elevation, partly in section, of a typical fuel bundle for a boiling water nuclear reactor.

Referring now to FIG. 1, a representative example of a fuel assembly is shown generally at 10. The assembly includes a plurality of fuel rods 12 forming a bundle. The rods 12 are connected at their upper ends to an upper tie plate 14 and are supported at their lower ends by a lower tie plate grid, generally designated 16, which forms part of a lower tie plate assembly, generally designated 18. Spacers 20 are arranged at a plurality of vertically spaced locations to maintain lateral spacing of the fuel rods 12 relative to one another. The fuel bundle is disposed within a fuel bundle channel 22 whereby coolant water introduced through the bottom nozzle or inlet opening 24 of the tie plate assembly 18 flows upwardly through a flow volume 26 defined by a peripheral wall 28 of the lower tie plate assembly 18, through the lower tie plate grid 16, and then along and about the fuel rods 12. As indicated previously, it is important that debris in the coolant be prevented from flowing through the lower tie plate assembly and into the area between the channeled fuel rods 12.

Figure 2:
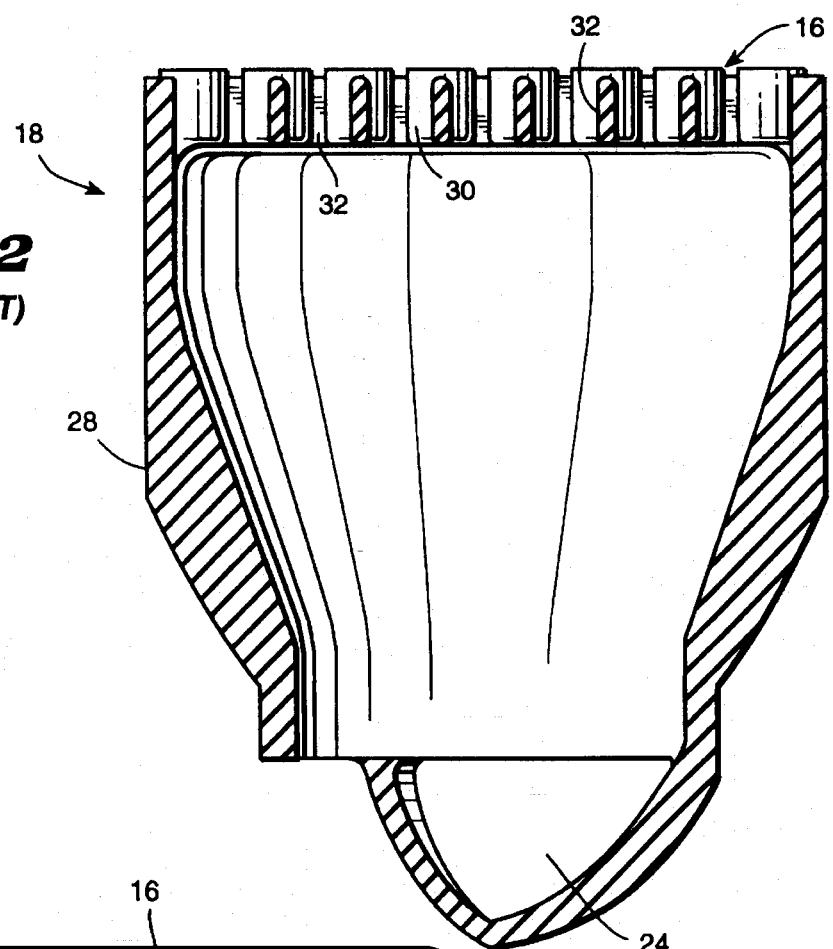
FIG. 2 is a side section of a lower tie plate assembly of the type used in the fuel bundle of FIG. 1.
Figure 3:
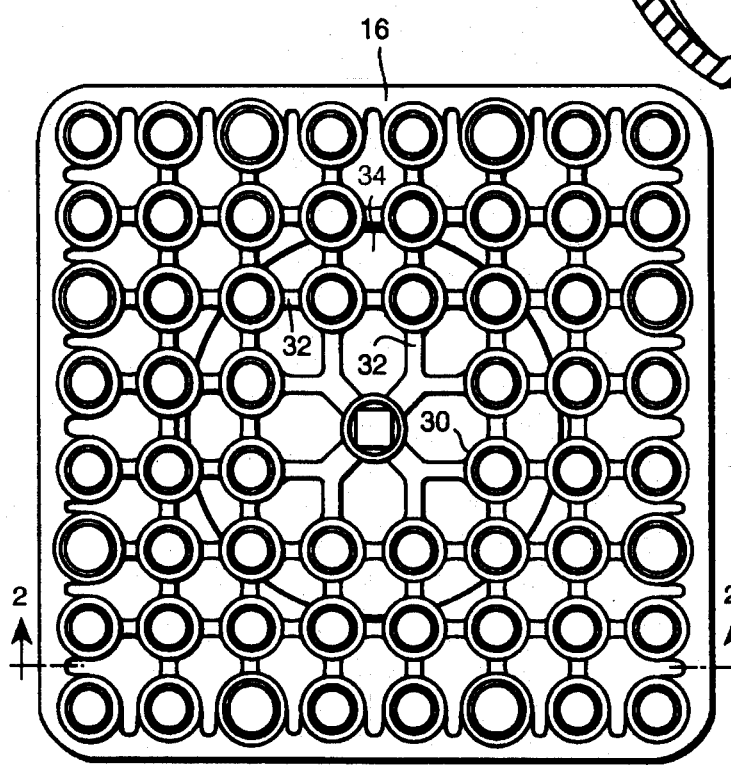
FIG. 3 is a plan view of the lower tie plate assembly shown in FIG. 2.

Referring now to FIGS. 2 and 3, there is illustrated a lower tie plate assembly 18 including the lower tie plate grid 16. The lower tie plate grid 16 is preferably (but not necessarily) formed separately from the lower portion (including the peripheral wall 28 and the bottom nozzle 24) of the assembly, and secured thereto by, for example, welding. The lower tie plate grid 16 supports the fuel rods 12 above the grid and to this end, the grid 16 includes a plurality of generally cylindrical, vertically extending bosses 30 having centerlines arranged at corners of substantially square matrices of such bosses. Interconnecting (and forming the sides of) the square matrices are webs 32 adjoining the adjacent cylindrical bosses 30 along radial lines of the bosses 30 and extending between the upper and lower surfaces of the grid 16. Consequently, it will be seen that the webs 32 have portions formed along the sides of each square matrix and, together with convex outer portions of the cylindrical bosses 30, define side walls of openings or flow areas 34 which permit coolant to flow through the grid 16 and into the channeled fuel bundle assembly.

Figure 4:
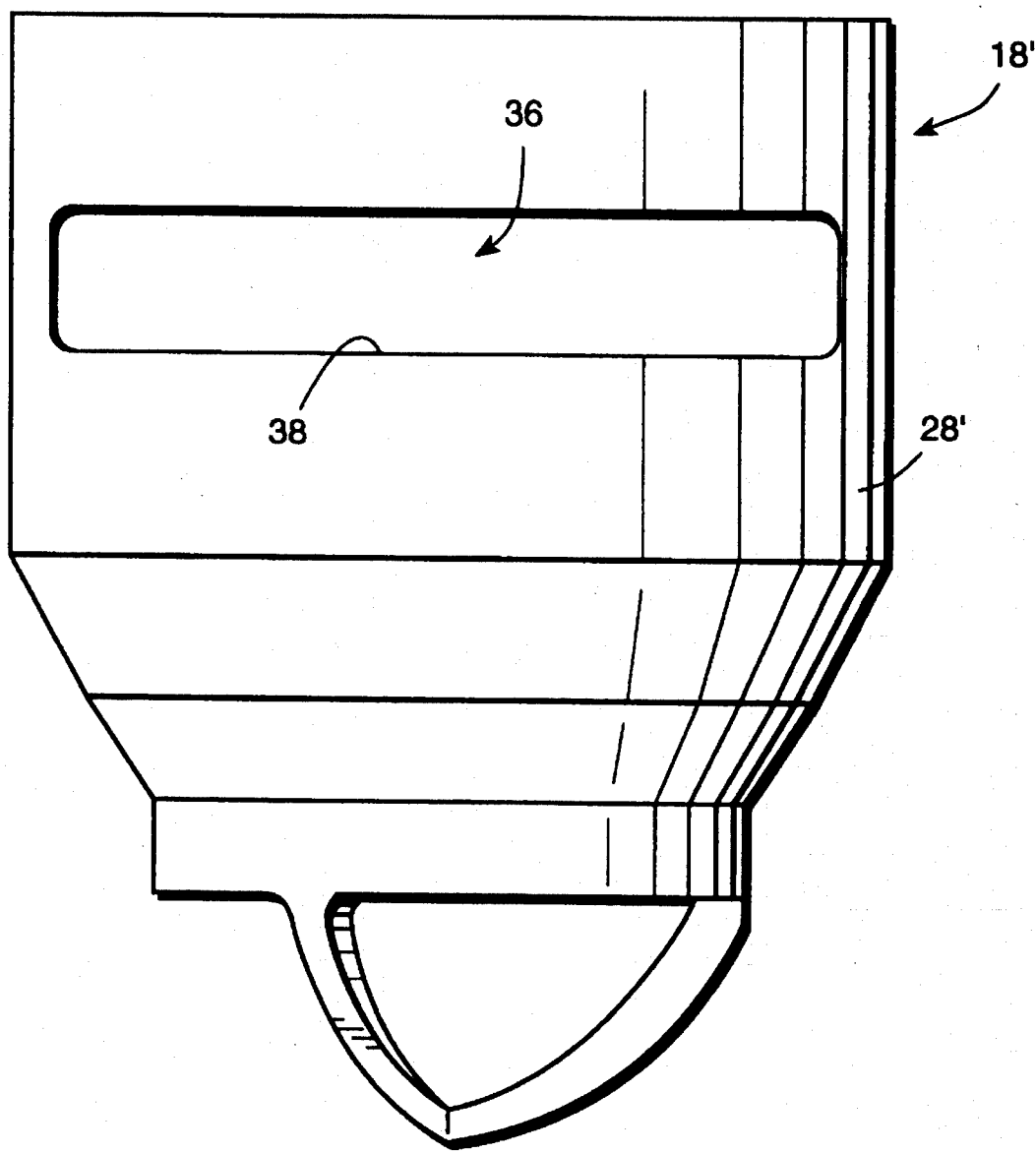
FIG. 4 is a side elevation of a lower tie plate assembly incorporating the debris catcher of this invention.
Figure 5:
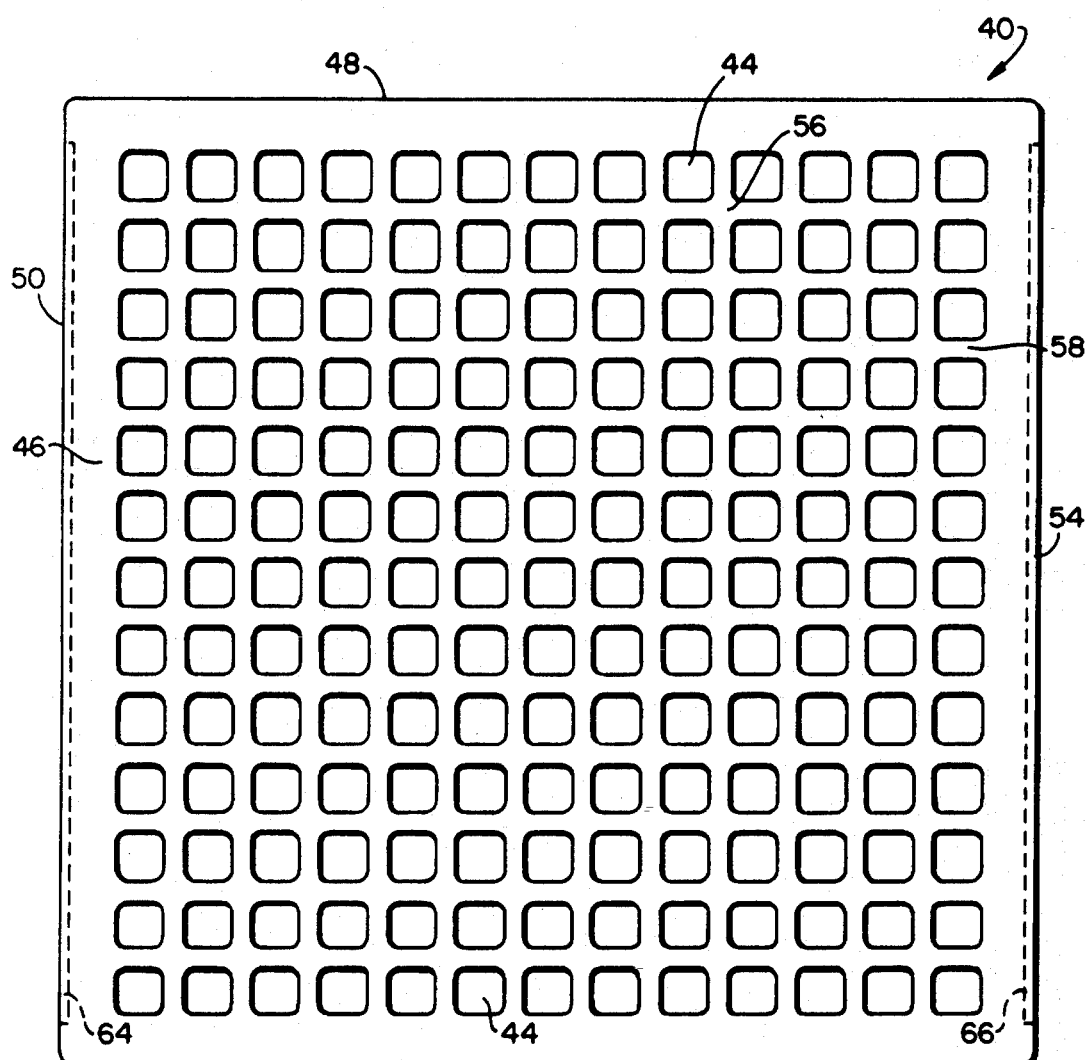
FIG. 5 is a plan view of an upper plate of the debris catcher of this invention.

Referring to FIG. 4, the debris catching function in accordance with this invention is performed by debris catcher cartridge 36 slidably received and welded within a pair of windows 38 (one shown) formed in opposite sides of the peripheral wall 28' of the lower tie plate assembly 18'. More specifically, the windows 38 are formed approximately midway along the straight-sided portion of the wall 28'.

Figure 6:
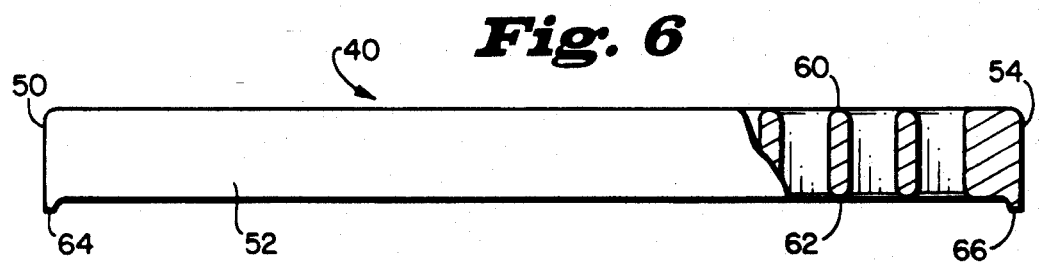
FIG. 6 is a front elevation, partly in section, of the upper plate shown in FIG. 5.

In accordance with a first exemplary embodiment of the invention, the debris catcher cartridge 36 is formed by a pair of relatively thick upper and lower substantially planar plates 40, 42, best seen in FIGS. 5–11. With specific reference to FIGS. 5 and 6, the upper plate 40 is formed with a plurality of relatively large holes 44, arranged in a square array within a substantially square border area 46 defined by four sides 48, 50, 52 and 54 of the substantially square plate 40. Each hole 44 is essentially square in shape, with rounded corners 56. The holes are arranged in parallel rows in each of two perpendicular directions, and are interconnected by a plurality of webs or ligaments 58 of uniform shape and thickness. As best seen in FIG. 6, the webs or ligaments 58 have rounded upper and lower edges 60, 62, respectively, for minimization of flow resistance.

Along sides 50, 54, the plate 40 is formed with elongated, downwardly projecting rails 64, 66, the purpose for which will be described further below.

Figure 7:
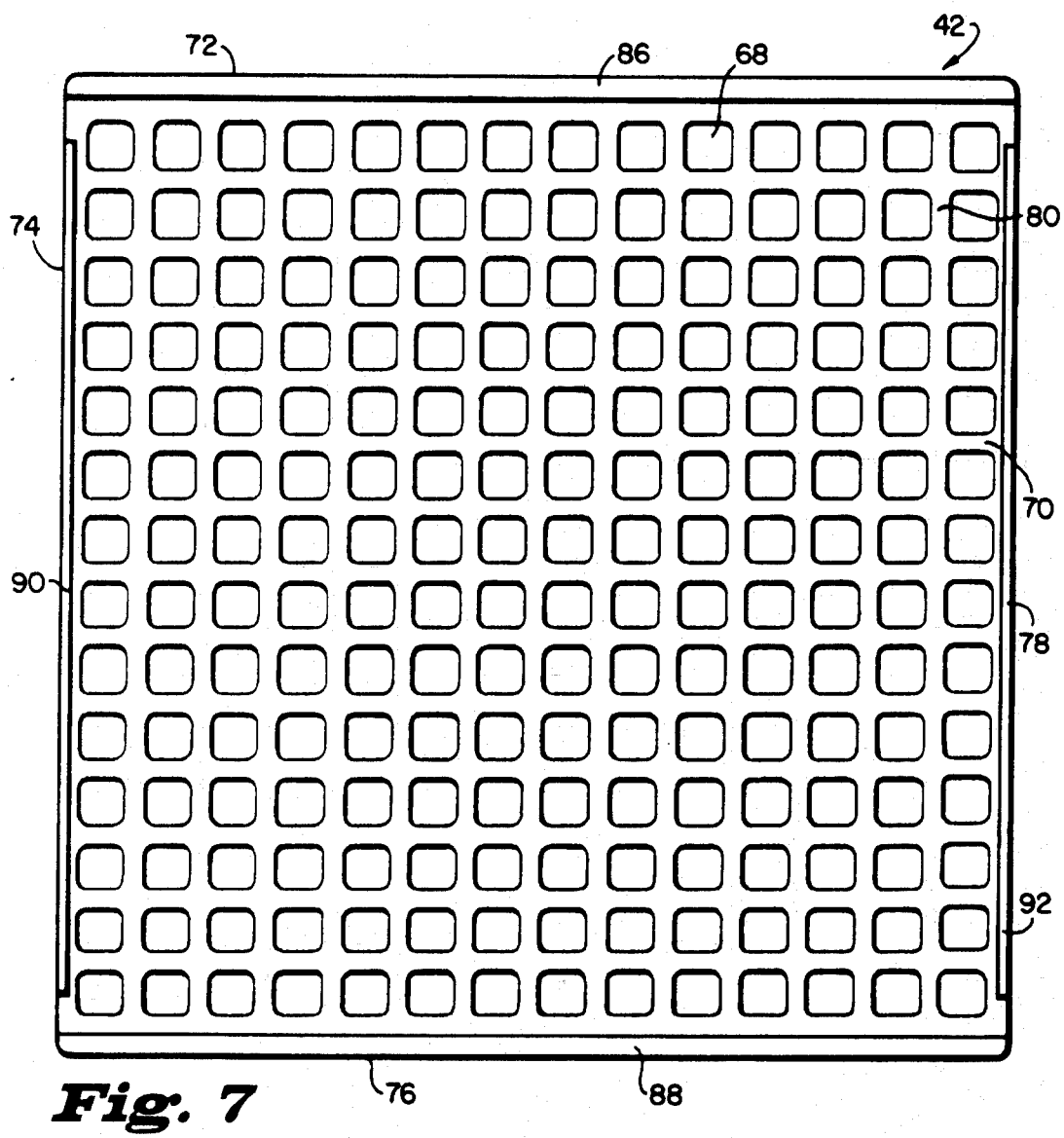
FIG. 7 is a plan view of a lower plate of the debris catcher of this invention.
Figure 8:
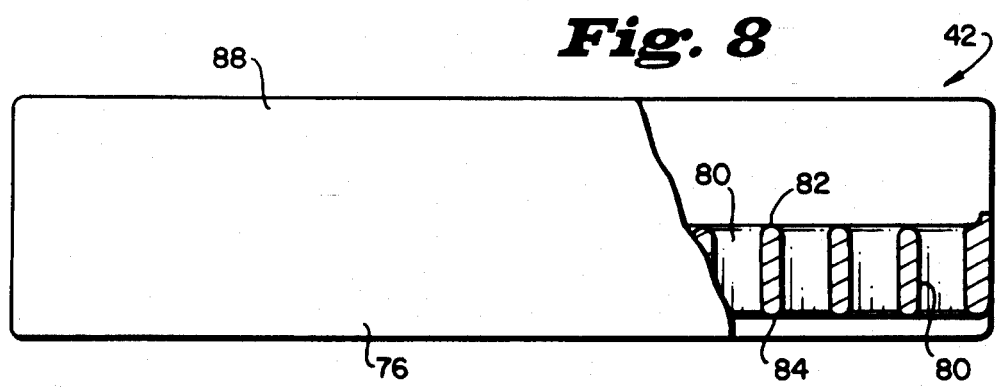
FIG. 8 is a front elevation, partly in section, of the lower plate shown in FIG. 7.

Turning now to FIGS. 7 and 8, the lower plate 42 of the debris catcher is also formed with a plurality of relatively large holes 68, arranged within a square border area 70 as defined by sides 72, 74, 76 and 78. Each hole 68 is of the same size, shape as holes 44, and the hole pitch is also identical. The holes 68 are similarly interconnected by a plurality of webs or ligaments 80 of uniform shape and thickness, and having rounded upper and lower edges 82, 84, respectively.

Figure 9:
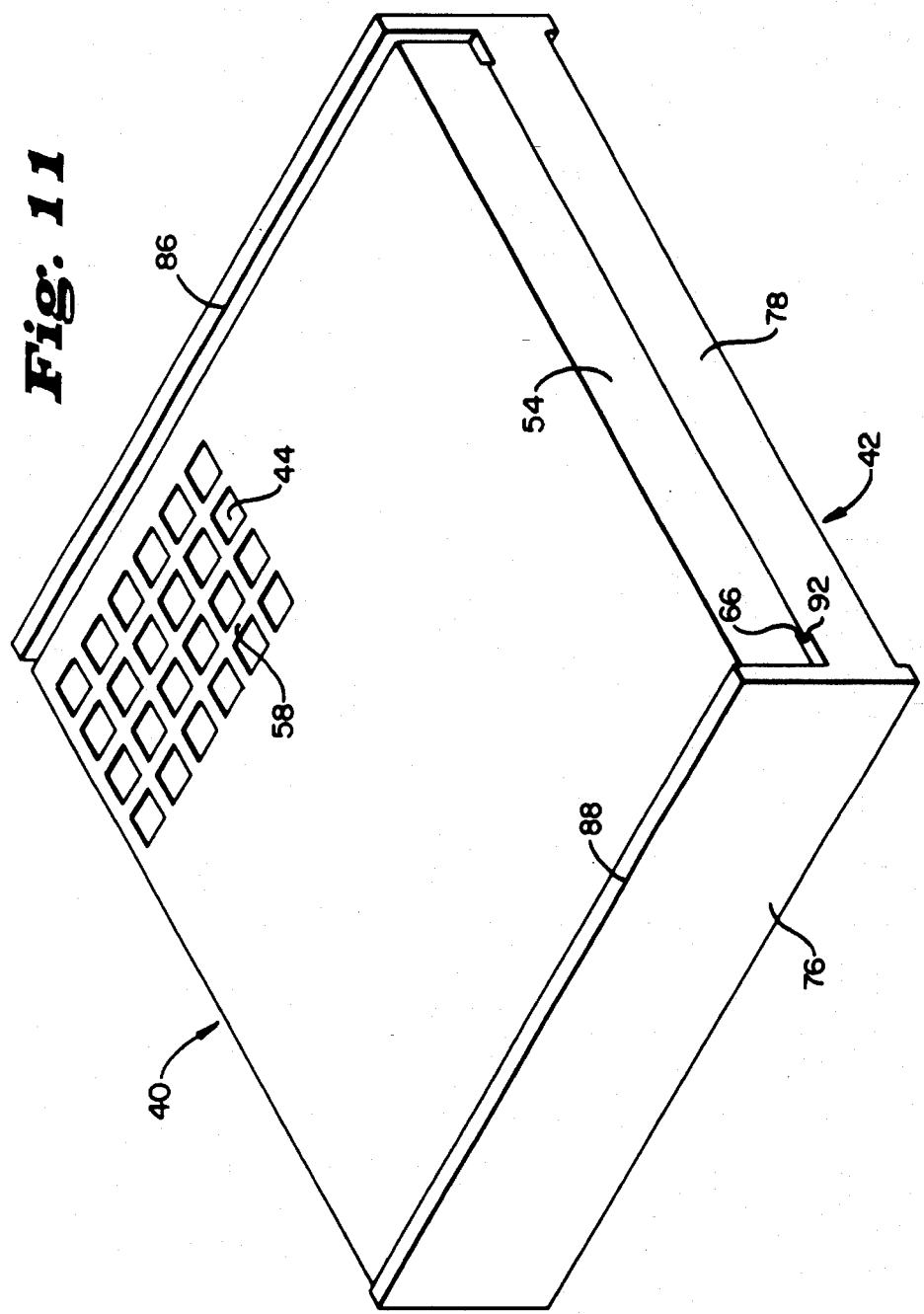
FIG. 9 is a side elevation of the debris catcher shown in FIG. 7.

The lower plate 42 is also formed with integral end plates 86, 88 along sides 72, 76, which end plates extend upwardly as best seen in FIG. 9. Opposite sides 74, 78 are formed with upwardly extending rails 90, 92.

It should be noted here that the lower plate 42 is formed with an additional row of holes 68 in both horizontal and vertical directions as viewed in FIG. 7, as compared to the upper plate 40. This arrangement, combined with a slightly larger dimension along the two opposite sides 74, 78 of the lower plate, enable the holes 44 and 68 to be laterally offset in each of two perpendicular directions. This offset will be discussed in greater detail in connection with FIGS. 12 and 13.

Figure 10:
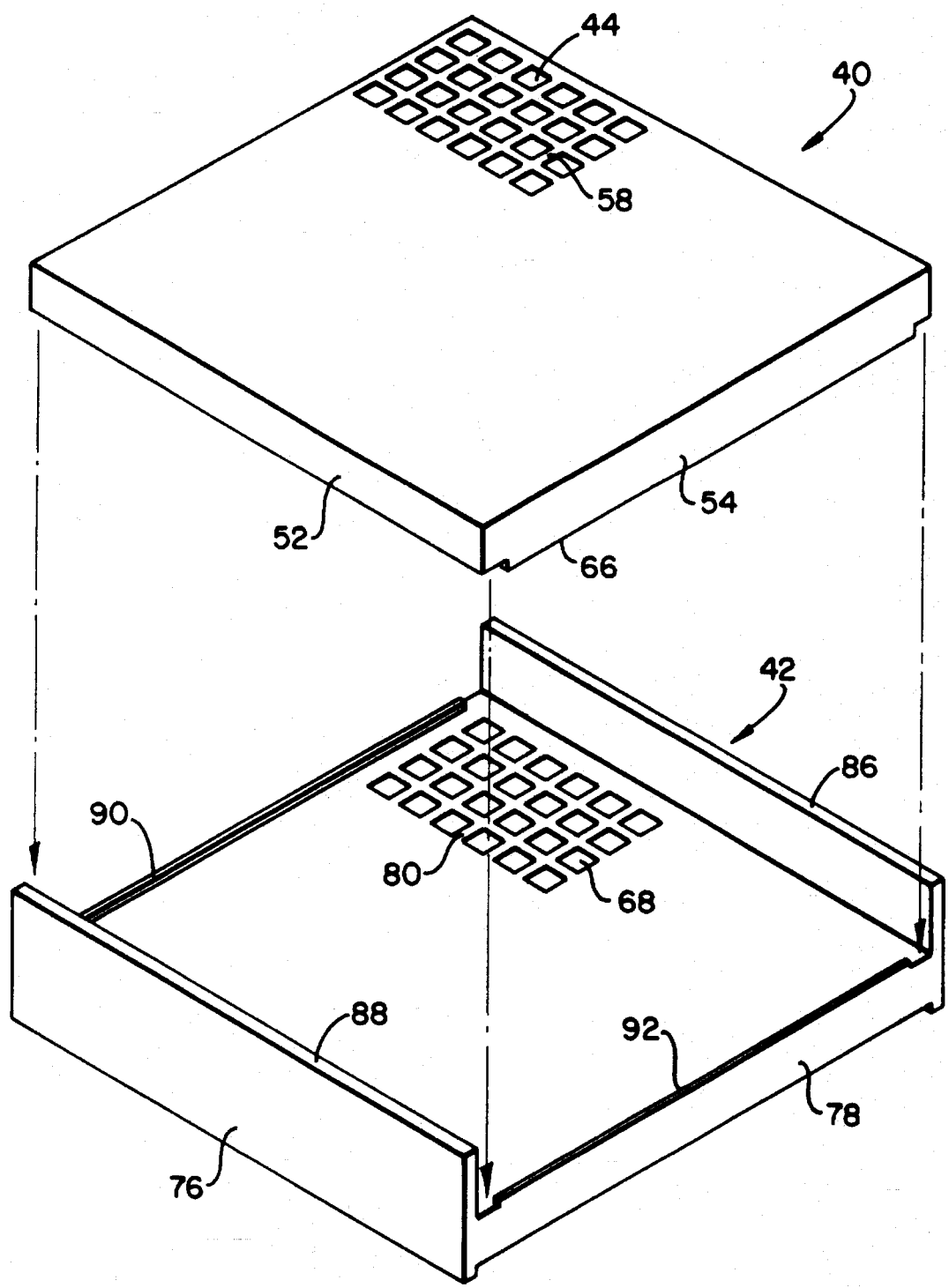
FIG. 10 is an exploded perspective of the upper and lower plates shown in FIGS. 7–9.

FIG. 10 illustrates the upper and lower plates 40, 42 in an assembly orientation, with rails 64, 66 of the upper plate 40 in alignment with rails 90, 92 of the lower plate 42.

FIG. 11 illustrates the upper and lower plates 40, 42 in assembled relationship. Preferably, the plates are welded along the abutting side rails 64, 90 and 66, 92. Note also that the upper plate 40 fits inside the side plates 86, 88.

Figure 12:
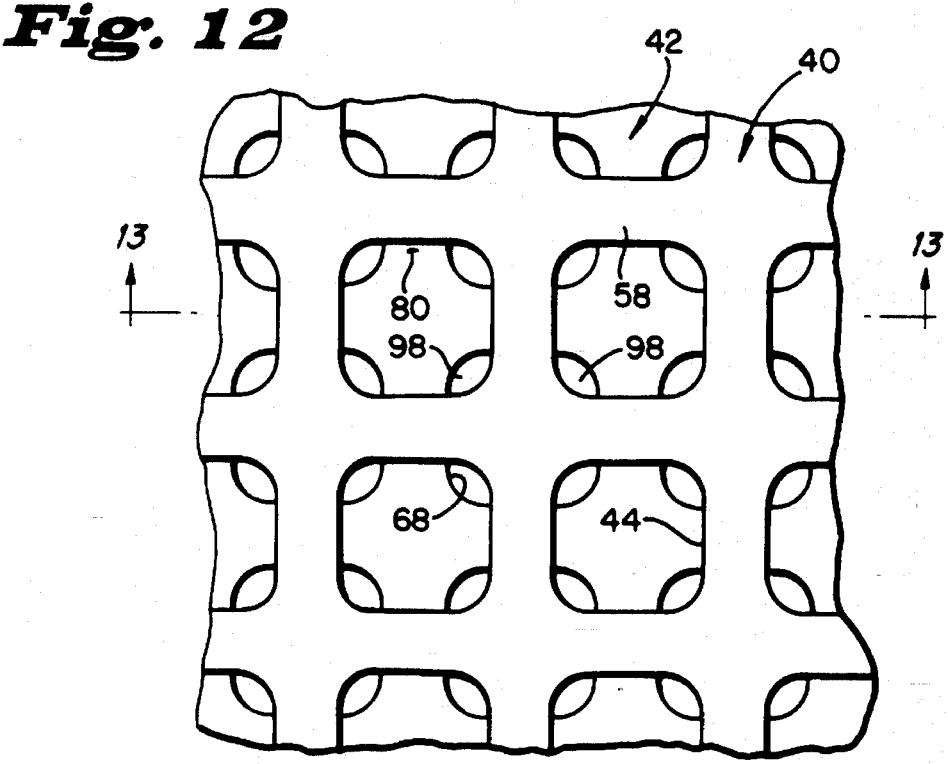
FIG. 12 is a partial plan of the upper and lower plates in the assembled state.
Figure 13:
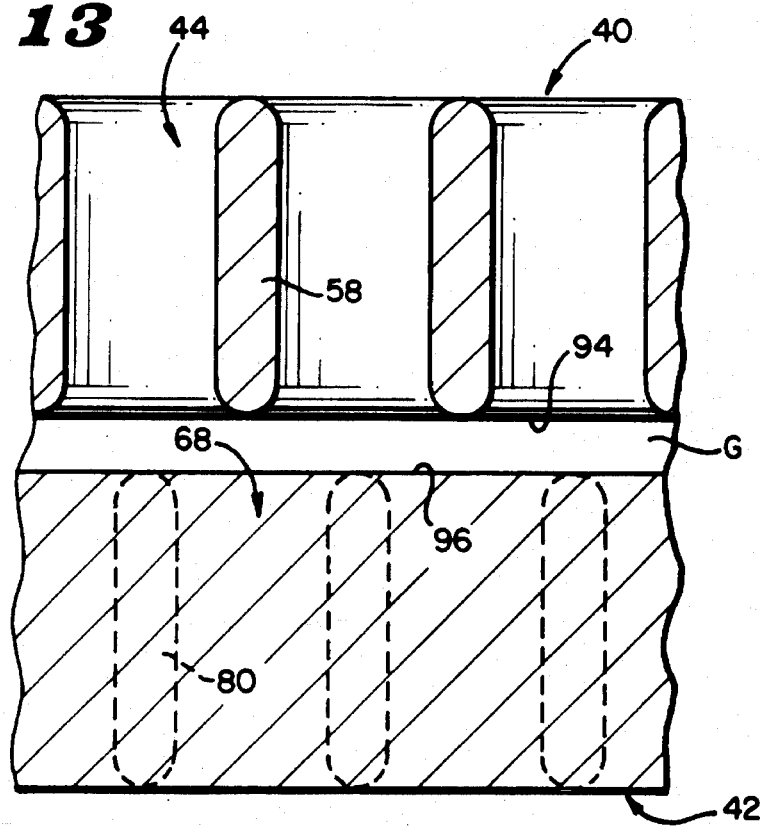
FIG. 13 is a section along the line 13—13 of FIG. 12.

With reference now to FIGS. 12 and 13, it may be seen that the lateral offset of holes 44 vis-a-vis holes 68 is equal to one half the hole spacing in each of two perpendicular directions. As a result, each hole 44 in the upper plate 40 is centered over the junction of four ligaments 80 in the lower plate 42.

FIG. 13 not only shows the offset between holes 44 and 68, but also a vertical gap G between the lower surface 94 of upper plate 40 and upper surface 96 of lower plate 42. This gap is determined by the vertical extent of the rails 64, 66 and 90, 92 of the respective upper and lower plates 40, 42. This gap G is necessarily a compromise between the twin goal of low pressure drop and debris size. In other words, if the gap G were zero, the pressure drop would be very large since all of the flow would be required to flow through the small areas 98 shown in FIG. 12. As the gap G increases from zero, flow can also move horizontally from the lower holes 44 to the upper holes 68. As the gap G increases further, the rod diameter which can pass through the debris catcher at an angle to vertical also increases. For a very large gap G, it may be appreciated that once the gap exceeds the debris rod length, the rod can pass through each plate as though the other plate were not even present.

In the embodiment described above, the following dimensions may be appropriate:

upper and lower hole side length—0.240 in.

upper and lower ligament width within array—0.100 in.

upper and lower plate thickness—0.450 in.

gap G—0.10 in.

Figure 14:
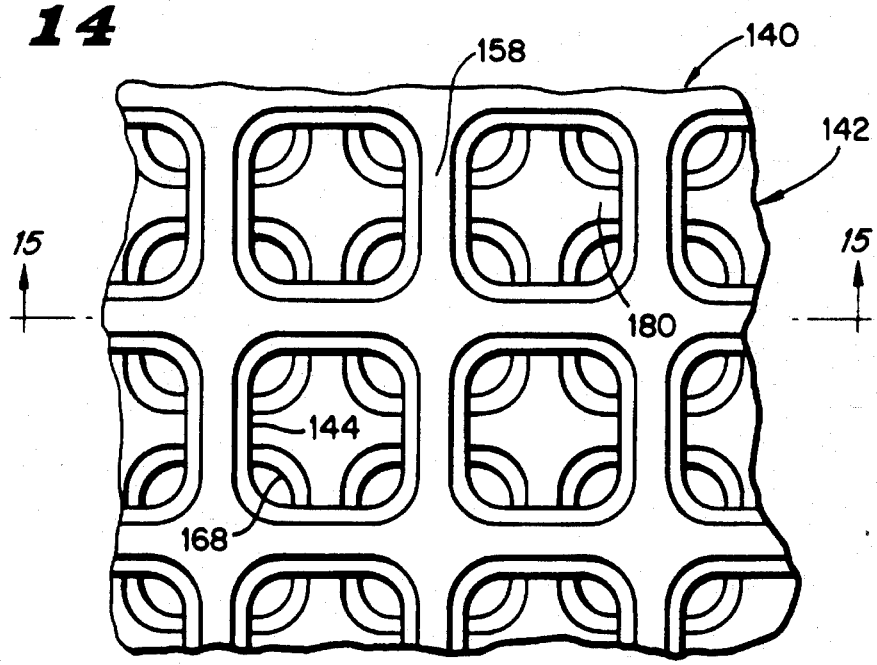
FIG. 14 is a partial plan of upper and lower plates in the assembled state in a second exemplary embodiment of the invention.
Figure 15:
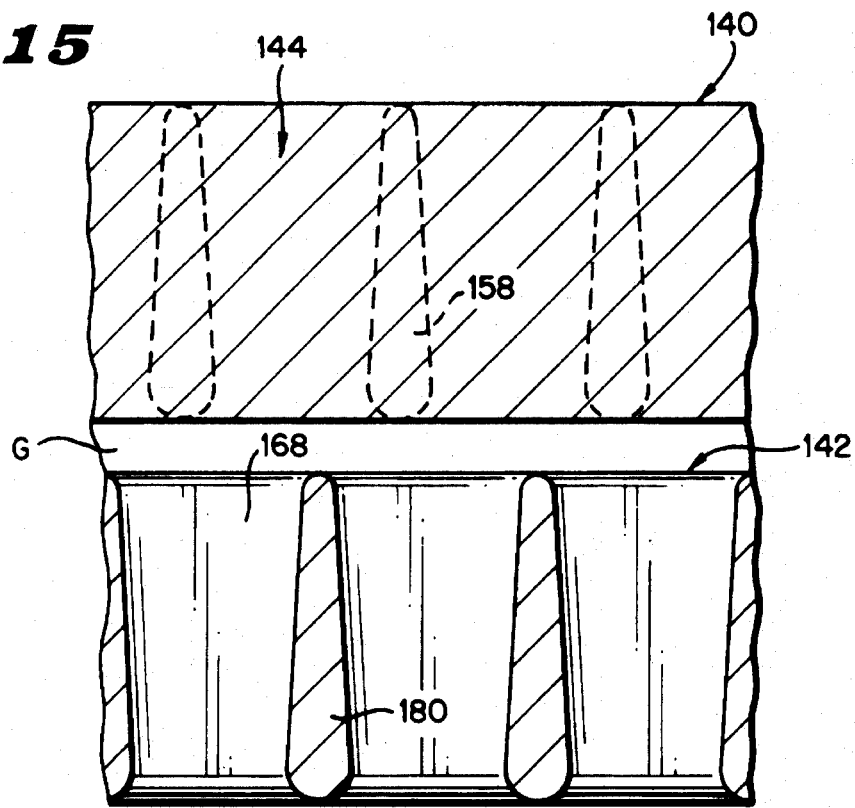
FIG. 15 is a section along the line 15—15 of FIG. 14.

Turning now to FIGS. 14 and 15, a second exemplary embodiment is illustrated wherein the overall double plate construction is similar to that described above, and for convenience, similar reference numerals, but with the prefix "1" are employed to designate corresponding elements. In this alternative debris catcher design, the ligaments 158 of the top plate 140, and the ligaments 180 of the lower plate 142 are tapered from bottom to top to provide a diffuser for flow through the respective holes 168 and 144. This arrangement also reduces exit pressure loss from the upper plate 140, and provides smoother flow transition from the lower plate 142 to the upper plate 140.

Figure 16:
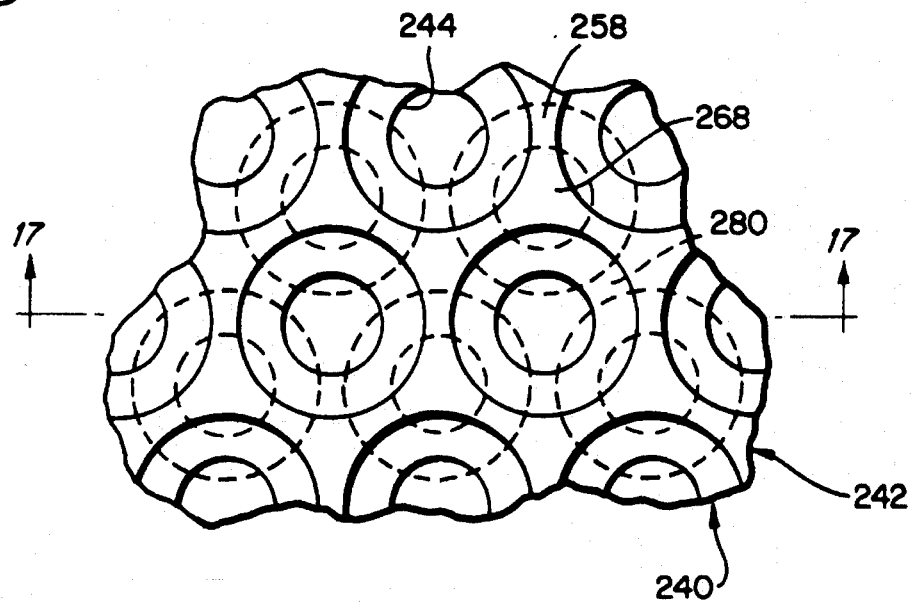
FIG. 16 is a partial plan of upper and lower plates in the assembled state in a third exemplary embodiment of the invention.
Figure 17:
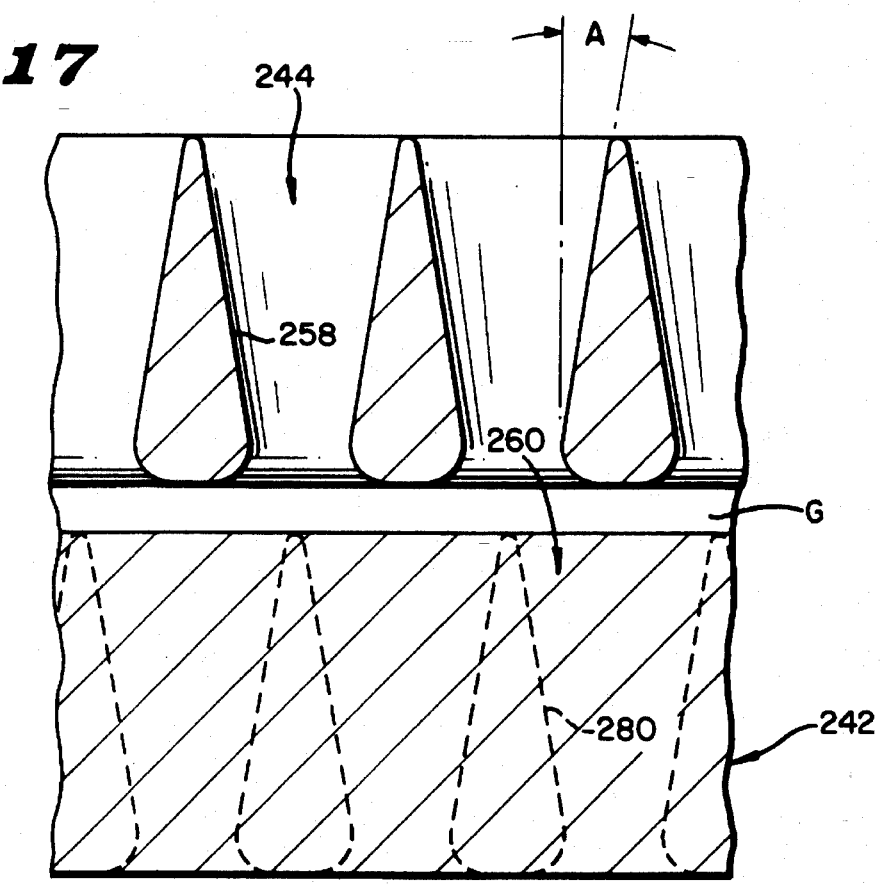
FIG. 17 is a section along the line 17—17 of FIG. 16.

Referring now to FIGS. 16 and 17, a third exemplary embodiment of the invention is illustrated where, again, the overall double plate debris catcher construction is retained and, in this case, similar reference numeral are used to designate correspondingly similar components, but with the prefix "2" added.

In this third exemplary embodiment, the holes 244 and 268 are round in shape, and tapered inwardly from top to bottom, in both plates 240 and 242. In addition, the holes of adjacent rows (in both perpendicular directions) in each plate are offset. As a result, each hole 244 in the upper plate 240 is centered over three holes 268 in the lower plate 242, best seen in FIG. 16. A preferred angle of taper, designated "A", is between about 7° to 9° to provide a minimal pressure drop as the flow expands from the minimum diameter areas in the holes of the respective plates.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A lower tie plate assembly for a nuclear reactor comprising:

an upper grid portion and a lower body portion, the upper grid portion having a plurality of fuel rod supporting bosses interconnected by a plurality of webs thus forming flow openings between the bosses; the body portion including an inlet nozzle and a peripheral wall extending between the inlet nozzle and the upper grid portion to define a flow volume therein; and a debris catcher located within said flow volume upstream of said upper grid portion and comprising a pair of superposed substantially planar and substantially parallel plates, said plates being vertically spaced from one another, and each having a plurality of holes of substantially identical size, shape and pitch, and wherein the holes of one of said pair of plates are offset laterally from the holes of the other of said pair of plates.

2. The lower tie plate assembly of claim 1 wherein said upper and lower plates are joined together to form a cartridge unit.

3. The lower tie plate assembly of claim 1 wherein said peripheral wall is formed with at least one window sized and shaped to receive said cartridge unit.

4. The lower tie plate assembly of claim 1 wherein said plurality of holes in each of said pair of plates are surrounded by a series of substantially vertical ligaments, said ligaments having rounded upper and lower edges.

5. The lower tie plate assembly of claim 4 wherein said plurality of holes in each of said pair of plates are substantially square in shape.

6. The lower tie plate assembly of claim 1 wherein said plurality of holes in each of said pair of plates are tapered inwardly from top to bottom.

7. The lower tie plate assembly of claim 1 wherein said plurality of holes in each plate are round.

8. The lower tie plate assembly of claim 7 wherein said plurality of holes in each plate are tapered inwardly from top to bottom.

9. The lower tie plate assembly of claim 1 wherein the holes of the respective plates are laterally offset by one half the hole pitch.

10. A fuel bundle and lower tie plate assembly for a nuclear reactor comprising a plurality of fuel rods supported between an upper tie plate and a lower tie plate assembly, the lower tie plate assembly comprising an upper grid portion and a lower body portion, the upper grid portion having a plurality of fuel rod supporting bosses interconnected by a plurality of webs thus forming flow openings between the bosses; the body portion including an inlet nozzle and a peripheral wall extending between the bottom nozzle and the upper grid portion to define a flow volume therein; and a debris catcher located within said flow volume upstream of said upper grid portion and comprising a pair of superposed substantially planar and substantially parallel plates, said plates being vertically spaced from one another and each having a plurality of holes of substantially the same size, shape and pitch, and wherein the holes of one of said pair of plates are offset laterally from the holes of the other of said pair of plates.

11. The fuel bundle and lower tie plate assembly of claim 10 wherein the holes of the respective plates are laterally offset by one half the hole pitch.

12. The lower tie plate assembly of claim 2 wherein each of said plates is provided with a pair of raised rails extending along opposite edges, and further wherein said upper and lower plates are joined along said pairs of rails, and further wherein said pairs of rails determine a vertical gap between said plates.

13. The fuel bundle and lower tie plate assembly of claim 10 wherein each of said plates is provided with a pair of raised rails extending along opposite edges, and further wherein said upper and lower plates are joined along said pairs of rails, and further wherein said pairs of rails determine a vertical gap between said plates.

* * * * *